(12) United States Patent
Surasinghe (10) Patent No.: US 7,966,514 B2
(45) Date of Patent: Jun. 21, 2011

(54) SCALABLE FAULT TOLERANT SYSTEM

(75) Inventor: Lakshitha C. Surasinghe, Kotte (LK)

(73) Assignee: Millennium IT (USA), Inc., Cambridge, MA (US)

( * ) Notice: Subject to any disclaimer, the term of this patent is extended or adjusted under 35 U.S.C. 154(b) by 701 days.

(21) Appl. No.: 11/523,354

(22) Filed: Sep. 19, 2006

(65) Prior Publication Data

US 2007/0067663 A1    Mar. 22, 2007

Related U.S. Application Data

(60) Provisional application No. 60/718,394, filed on Sep. 19, 2005.

(51) Int. Cl.
*G06F 11/00* (2006.01)

(52) U.S. Cl. .......................................... 714/4

(58) Field of Classification Search .............. 714/4, 48
See application file for complete search history.

(56) References Cited

U.S. PATENT DOCUMENTS

| | | | |
|---|---|---|---|
| 5,566,297 A | 10/1996 | Devarakonda et al. | |
| 7,225,356 B2 * | 5/2007 | Monitzer | 714/12 |
| 7,308,615 B2 * | 12/2007 | Fujibayashi | 714/47 |
| 7,401,265 B2 * | 7/2008 | Bae et al. | 714/47 |
| 2002/0073354 A1 | 6/2002 | Schroiff | |
| 2004/0199804 A1 | 10/2004 | Rthunde | |

FOREIGN PATENT DOCUMENTS

| | | |
|---|---|---|
| EP | 0631233 | 12/1994 |
| EP | 1320217 | 6/2003 |
| WO | WO 97/49039 | 12/1997 |
| WO | WO 02/21276 | 3/2002 |

OTHER PUBLICATIONS

Daniel M. Dias, William Kish, Rjat Mukherjee, Renu Tewari, "A Scalable and Highly Available Web Server", 1996 IEEE p. 90.*

* cited by examiner

*Primary Examiner* — Michael C Maskulinski
*Assistant Examiner* — Amine Riad
(74) *Attorney, Agent, or Firm* — Cesari and McKenna, LLP (57) ABSTRACT

A fault tolerant system for a highly scalable distributed processing system in which fault tolerant groups (hereafter referred to as "FT groups") are formed based on the functionalities of applications. A given FT group includes instances of the same applications and also different applications that perform the same function. The instances within the FT group are ranked as a primary and mirrors, which descend in rank. When the primary instance in the FT group crashes, that is, fails or becomes otherwise unavailable, the system utilizes the next ranking available (running) instance in the FT group as the primary instance. The change over to the next ranking mirror application is performed quickly and without loss of functionality through an exchange of "FT messages" under the control of a central monitoring and change-over control sub-system.

53 Claims, 3 Drawing Sheets

SCALABLE FAULT TOLERANT SYSTEM

CROSS-REFERENCE TO RELATED APPLICATION

The present application claims the benefit of U.S. Provisional Patent Application Ser. No. 60/718,394 which was filed on Sep. 19, 2005, by Lakshitha Surasinghe for a Scalable Fault Tolerant System and is hereby incorporated by reference.

BACKGROUND OF THE INVENTION

1. Field of the Invention

The invention relates generally to fault-tolerant distributed processing systems and, in particular, to failover mechanisms for the fault tolerant systems.

2. Background Information

Distributed processing systems utilize applications residing on many servers. The applications communicate with one another while performing various tasks, such that processing data may involve several applications that must collaborate at various times. The processing involved in the tasks relies on the various applications being available at the appropriate times to process and provide the necessary data. The number of applications involved in a given task depends on the particular task and on the magnitude of the processing to be performed.

To ensure the availability of critical operations, fault tolerance may be added to the system. Depending on the applications, prior systems may require that processing operations take place on duplicate servers. In such systems the duplicate operations may be burdensome to the system and/or may slow the overall system operations. In other known systems, each processing node or server keeps track of the status of the other servers in order to determine when a failover between a primary server and the backup server that shares access to the same data files should occur. A problem with such systems is that the failover operations must be essentially re-configured when, for example, new servers are included in the system. What is needed is a failover, or change-over, mechanism that is readily scalable.

SUMMARY OF THE INVENTION

The invention is a fault tolerant system for a highly scalable distributed processing system in which fault tolerant groups (hereafter referred to as "FT groups") are formed based on the functionalities of applications. A given FT group includes instances of the same applications and also different applications that perform the same function. The instances within the FT group are ranked as a primary and mirrors, which descend in rank. When the primary instance in the FT group crashes, that is, fails or becomes otherwise unavailable, the system utilizes the next ranking available (running) instance in the FT group as the primary instance. The change over to the next ranking mirror application is performed quickly and without loss of functionality through an exchange of "FT messages" under the control of a central monitoring and change-over control sub-system.

The monitoring and change-over control sub-system, which is referred to herein as an "FT Monitor," includes an FT Monitor Processor that assigns the rankings to the applications in the FT groups and monitors the status (running or not running) of the applications through FT Monitor Agents. The FT Monitor Agents reside on the machines, or servers, and monitor the status of the applications installed thereon. The respective applications include FT Monitor Interfaces that communicate with the server-based FT Monitor Agents.

A given FT Monitor Agent receives heartbeat messages at predetermined intervals from the FT Monitor Interfaces in each of the applications running on the same machine.

The FT Monitor Agent determines that an application has crashed if the FT Monitor Agent does not receive the heartbeat messages from the application over some number of intervals. Similarly, the FT Monitor Processor determines that a server is down or otherwise unavailable if the FT Monitor Processor does not receive heartbeats from the associated FT Monitor Agent over some number of intervals.

The FT Monitor Agent notifies the FT Monitor Processor when an application crashes. When the failed application is the primary application in an FT group, the FT Monitor Processor manages a change-over operation by broadcasting appropriate FT messages. The FT Monitor Processor first broadcasts a DOWN message that notifies the entire system that the particular application has failed, or crashed. In response to the DOWN message, all applications that communicate with the failed primary application disconnect from the primary application and wait for a next application to take over as the primary. As appropriate, the FT Monitor Processor also notifies a registry, which keeps track of the status of at least the primary applications of the FT groups, that the particular application has failed. The registry then lists the application as "off line," which "frees" the number one rank for assignment to another application in the FT group.

Next, the FT Monitor Processor broadcasts a CHANGE message with the IP address, process ID and rank of the highest ranking available mirror application that is then running in the same FT group. The broadcast CHANGE message is acted on only by the mirror application that is identified in the message. The identified application responds to the message by taking the appropriate steps to configure itself, or come up, as the primary. The appropriate steps depend on the particular application and may require the mirror application to, for example, build data files and so forth.

Once the mirror application is up as the new primary, the application, as necessary, notifies the registry and the registry identifies the application as the primary for the appropriate FT group. The new primary also notifies the FT Monitor Processor, which then broadcasts a READY message over the system. In response, applications re-establish communications with the new primary application and re-send to the (new) primary any unacknowledged messages that were previously sent to the failed primary application, as discussed in more detail below.

The system can readily add a new instance to an existing FT group by listing the instance as a group member when the instance is added to the system and, thereafter, when the new instance comes up on the system, assigning the instance a rank within the FT group. The system can readily add new processes, and thus, new FT groups, by incorporating new definitions into the system, associating new applications and instances to the respective new FT groups, and as the applications and instances come up on the system assigning to the applications and instances rankings within the respective FT groups. The fault tolerant system is thus readily scalable, since the change-over operations, under the control of the FT Monitor Processor, operate in the same way, regardless of the number of FT groups and/or the number and locations of the applications within the various FT groups.

As discussed in more detail below, the mirror applications may be configured to provide particular services, such that applications may connect to the mirrors instead of or in addition to the primary applications. When a mirror that provides the services fails, the system uses the FT messages to inform the other applications of the failure, and thus, of the need to re-connect to either a different mirror application or the primary application in the FT group.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
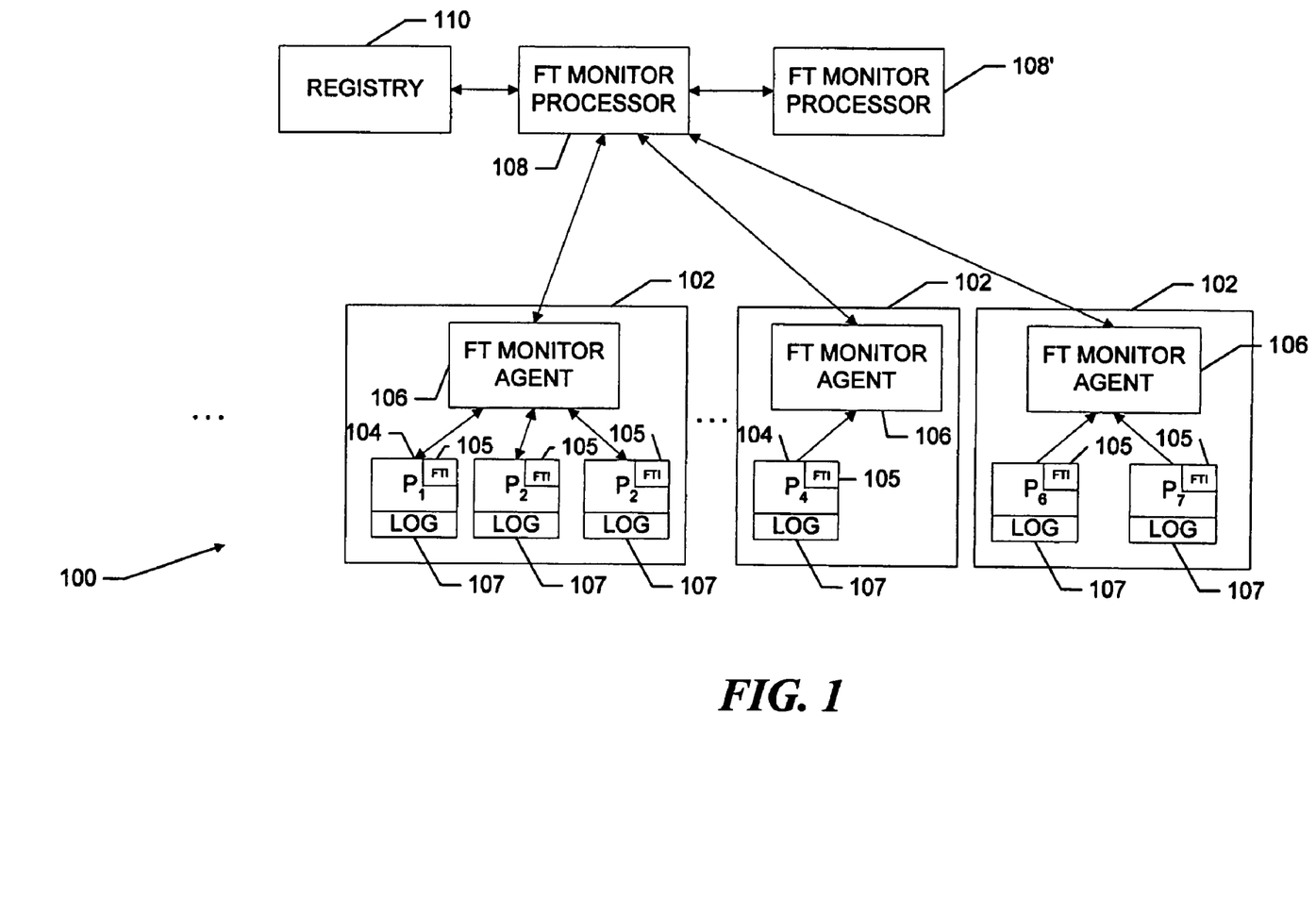
FIG. 1 is functional block diagram of a system constructed in accordance with the invention.

Referring now to FIG. 1, a distributed processing system 100 includes various machines, or servers, 102 on which processes, or applications, 104 reside. Each server further includes an application monitoring sub-system 106, referred to hereinafter as an "FT Monitor Agent" that communicates with FT Monitor Interfaces 105 in the respective resident applications 104. The FT Monitor Agents in turn, communicate with a central fault tolerant monitoring and change-over processor 108, which is referred to hereinafter as an "FT Monitor Processor." The FT Monitor Processor monitors, through the FT Monitor Agents, the status of each of the applications 104 and determines that the respective applications are running (on-line) or not running (off-line). Similarly, the FT Monitor monitors the status of each server 102 and determines if the respective servers are isolated or not isolated.

The system further includes a registry 110 that records the locations and other identifying information for at least the primary applications that "service" other applications, that is, applications that provide services to client applications. As discussed in more detail below, the primary applications are those ranked number one within respective fault tolerant groupings (hereinafter "FT groups"). For each application included in the registry, the registry records an IP address, a port number and a service ID, which is an identifier that is unique to the type of process. The registry does not include information for the primary applications that are in FT groups that do not service other applications.

An FT group is a grouping of applications by function, such that each application or instance thereof that performs the same function, i.e., complies with the same functional specification, is included in the same FT group. The applications within the same group are assigned ranks as either a first or primary application or mirror applications, which descend in rank. The primary application essentially performs all of the processing, while the mirrors generally standby to take over should the primary fail. When the number one ranked application in a given FT group fails, or otherwise becomes unavailable, the system utilizes the next ranking available mirror application as the new primary, such that there is essentially no down time in providing the associated functionality. The change-over operations, which occur under the control of the FT Monitor Processor, are discussed in more detail below.

Certain groups may have more than one primary, such that, for example, the rank two mirror application will also be configured to function as the primary. All of the processing is then duplicated at the number one and two ranked applications, and the system may select to use the results produced by either one of the applications or compare the results. The various mirror applications in the groups may all change rank when the primary fails or, preferably, all retain their current rankings except for the newly appointed primary, as discussed also in more detail below.

At start up of an application 104 contacts the registry 110 to determine the location of a central depository, or dictionary, (not shown) that contains system and message definitions, including the definitions of all "FT messages," which are messages that are utilized in fault tolerant operations. The application then contacts the central depository and downloads the definitions from the dictionary, and essentially "comes up" on the system.

The application 104 next contacts the FT Monitor Processor 108 and downloads system configuration information. The application is also assigned an FT group rank by the FT Monitor Processor, based on when the application contacted the processor for the configuration information relative to the other applications in the same FT group. Thus, the application that contacts the FT Monitor Processor first is ranked number one, or primary, in its FT group, the application that contacts the FT Monitor Processor second is ranked number two, and so forth. If the application is ranked primary and the application is one that will provide "services" to client applications, the application reconnects to the registry 110 and provides to the registry the application's location, i.e., its IP address and port number, and its service ID, which is unique to the process or function provided by the application. The service ID may be part of the application specification or may be a variable that is configurable by the associated FT Monitor Interface 105. The registry records the service ID, and the location information for the applications that provide services and lists the applications as "on-line." The number one ranked application thereafter operates as the primary application for the FT group and other applications that require the particular process or functionality are directed to connect to the primary application through the listing in the registry.

The applications 104, through the FT Monitor Interfaces 105, provide "heartbeats" at predetermined intervals to the resident FT Monitor Agent 106, such that the FT Monitor Agent can determine that the respective applications are running. The FT Monitor Agents, in turn, send heartbeats to the FT Monitor Processor 108 at predetermined intervals, to establish that the respective servers 102 are running. The FT Monitor Processor monitors the communications from the respective FT Monitor Agents and maintains information on the status, that is, running or not running, of every application on the system 100. The FT Monitor Processor also maintains as status information for each application both the name of the applicable FT group and the associated rank of the application.

An FT Monitor Agent 106 determines that a given application 104 has crashed if the application does not, within a predetermined time, supply at least one heartbeat. The predetermined time, or count, is configured to include a selected number of heartbeat intervals. For example, the count may be three intervals, and the FT Monitor Agent determines a crash has occurred if an application has not supplied a heartbeat before the end of the count, i.e., before the expiration of three successive intervals. The FT Monitor Agent then notifies the FT Monitor Processor 108 that the particular application has failed. If the failed application is included in the registry, the FT Monitor informs the registry 110 of the failure and the registry then lists the application as "off-line." Otherwise, or in the addition, if the application is ranked as the primary, or number one, application in an FT group the FT Monitor Processor starts the process of changing over to the highest ranking available mirror application in the FT group. Before discussing the change-over process, we discuss how the system operates when all of the primary applications are running.

The applications 104 communicate with one another during processing operations using processing messages. Each processing message is given a sequence number by a sequencer process (not shown) when the message originates in the system 100. For tracking purposes, the messages may also be given additional sequence numbers as the messages pass through various applications. Each application retains the respective messages in one or more log files 107 until acknowledgements are received from "down stream" processes. An application provides an acknowledgment to an upstream application when the corresponding message has been fully processed. When a given application receives an acknowledgement, the application removes the corresponding message from its log files, and the application then sends an acknowledgement to the next upstream process, and so forth. The acknowledgements are typically sent in batches, as the processing operations are completed. The last process to receive an acknowledgement is thus the sequencer process.

As discussed, each application 104, through its FT Monitor Interface 105, sends heartbeats to the resident FT Monitor Agent 106 at regular intervals, and the FT Monitor Agent sends heartbeats, in turn, to the FT Monitor Processor 108. If the FT Monitor Agent does not receive a heartbeat from a given application within the count, the FT Monitor Agent notifies the FT Monitor Processor that the application has failed, and if appropriate, the FT Monitor Processor initiates a change-over operation.

Figure 2:
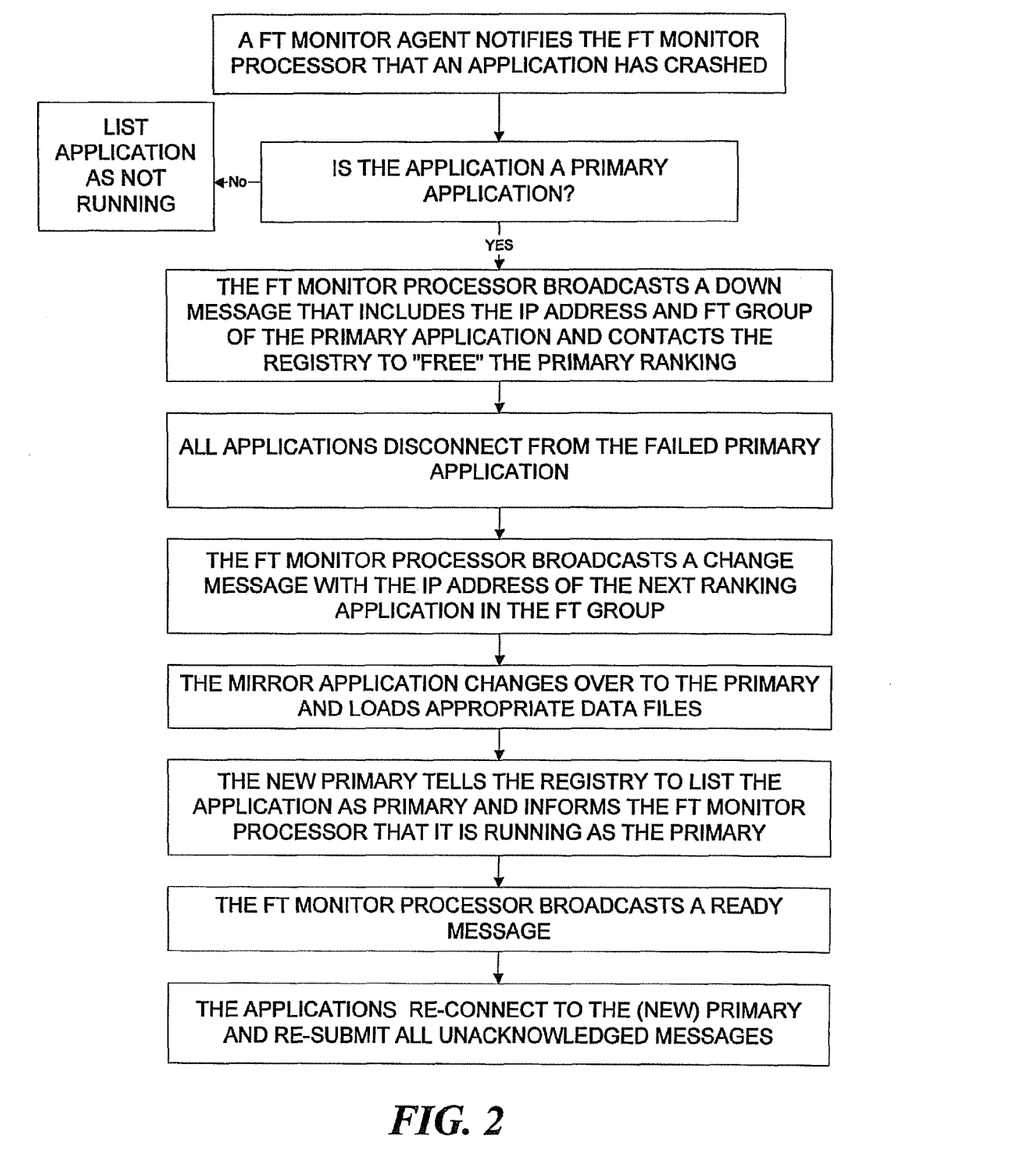
FIG. 2 is a flow chart of a change-over operation.
Figure 3:
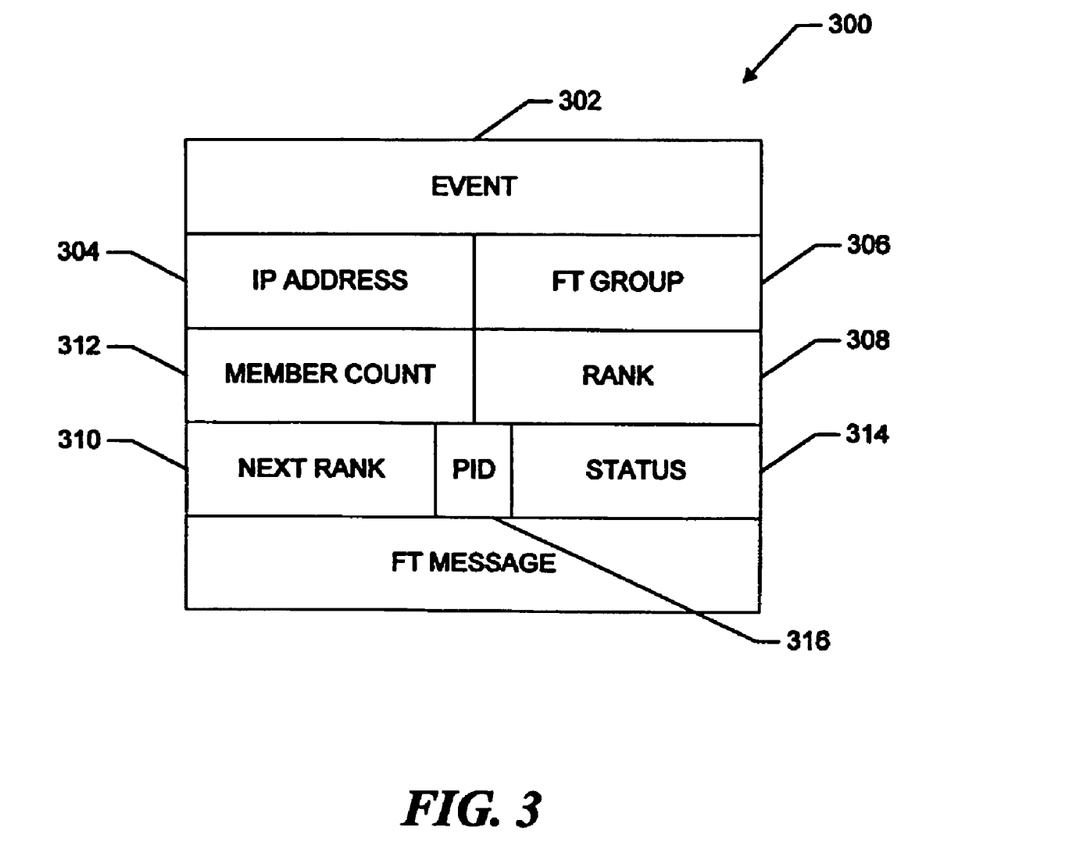
FIG. 3 is an illustration of FT message fields.

Referring now also to FIGS. 2 and 3, we discuss the change-over operations. In flowchart 200, when the FT Monitor Agent 106 notifies FT Monitor Processor 108 that an application has crashed in step 205, then, in step 210, the FT Monitor Processor determines if the failed application is the primary one for an FT group based on the status information maintained by the FT Monitor Processor. If the application is ranked number one (primary), then, beginning at step 220, the FT Monitor Processor broadcasts a series of FT messages 300 that inform the system of the change-over from the primary to the highest ranking available mirror application. Otherwise in step 215, as appropriate, the FT Monitor Processor broadcasts FT messages associated with the failure of an application that is ranked as a mirror application.

An FT message 300 contains a number of fields 302-316, as shown in FIG. 3. The fields that are related to the change-over operation are an event field 302, an IP address field 304, an FT Group field 306, a rank field 308, a next rank field 310, a member count field 312, and a Process ID field 316. In the embodiment described herein, additional fields such as a system status field 314 may be included to aid in debugging operations, and so forth.

The event field 302 is set to a value that denotes the particular event that has occurred, for example, the event field may be set to a value that indicates that an application has crashed, or is "down." Other events include a change in rank, a (new) primary ready for processing messages, an isolated server, and a terminated application, as discussed below. In addition, the event may be a system-wide event, such as the suspension or resumption of operations of, for example, an entire FT group, and thus, a change in system functionality. The FT messages denoting a change-over or a system-wide failure condition are broadcast by the FT Monitor Processor 108. An FT message designating an isolated server originates at an FT Monitor Agent 106 and is sent to the resident applications, to inform the applicants that they are isolated. A terminated application FT message is sent point-to-point from the FT Monitor Processor 108 to the terminated application 104, after a user-initiated request for termination is received by the system.

The IP address field 304 of an FT message contains the IP address of the server in which the application that is the subject of the FT message resides, and the Process ID field 316 contains the process ID assigned to the application by the operating system. The FT group field 306 lists the FT group of which the application is a member, and the rank field 308 lists the rank currently assigned to the application. As discussed in more detail below, the next rank field 310 lists the new rank for the application, as appropriate. The member count field 314 lists the number of instances remaining in the FT group, that is, the number of available or running applications in the FT group. The status field 314, which is used to indicate the status of the system as opposed to an individual application, is set when the event field indicates a system-wide event, such as the suspension of an FT group when the member count is reduced to zero.

To start the change-over operation after an application has failed at step 220, the FT Monitor Processor 108 sends an FT message 300 that informs the system 100 that the primary application 104 in a particular FT group is down. The message thus has the event field 302 set to a value that corresponds to a failed application, and includes in the appropriate other fields the IP address, Process ID, FT group name, and rank of the failed primary application. The message may also include the number of applications still running in the FT group. For example, if there are a total of four applications in the FT group, the member count will be three since the failed application is subtracted from the member count. When the member count reaches a predetermined minimum count, the FT subsystem notifies the system administrator. The system administrator may then add new instances or attempt to re-establish old instances, as appropriate. The predetermined minimum is configurable per FT group.

For convenience, we hereinafter refer to the FT messages by the indicated events. For example, the FT message with the event field set to convey that an application has failed is referred to hereinafter as a "DOWN message."

As appropriate, the FT Monitor also contacts the registry 110 and instructs the registry to list the failed primary application as "off-line" and "free" the associated primary ranking. In response to the receipt of the DOWN message 300, all applications that are connected to the (failed) primary application disconnect from the application. Before receipt of the DOWN message, the applications continue to send processing messages to the primary application, while at the same time recording the messages and corresponding sequence numbers in their log books. As discussed earlier, the applications retain the messages in their log books until acknowledgements are received. Accordingly, after a new primary is up and running and/or the old primary re-connects to the system as the primary, the applications can re-send any of the unacknowledged messages to the appropriate application.

After the DOWN message, in step 230, the FT Monitor Processor 108 broadcasts a CHANGE message that includes the IP address and process ID of the next ranking mirror application that is then running. In the example, the rank two application is running, and thus, the message lists the event as a change and includes the IP address for the server on which the number two ranking application is running and the process ID assigned to the application by the operating system. The CHANGE message also specifies the next rank that is to be assigned to the mirror application, namely, rank number 1.

Only the server and the application that are identified in the message respond to the CHANGE message. The FT Monitor Agent 106 in the identified server provides the message to the FT Monitor Interface 105 of the identified application, and in step 235, the application then configures itself as the primary of the FT group by making all necessary connections with various other applications, loading necessary information such as data files, and so forth.

As necessary, the new primary also informs the registry 110 that it has changed-over to the primary and provides to the registry the application's location information in step 240. The (new) primary also notifies the FT Monitor Processor 108 that the application is now running as the primary, and in step 245, the FT Monitor Processor then broadcasts a READY message. The READY message lists the IP address, process ID, FT group and number one rank of the (new) primary. In step 250, all applications that then need to communicate with this application, i.e., utilize the particular functionality, connect to the newly identified primary application and re-submit to it the unacknowledged messages in their log files 105.

For system security reasons, the IP addresses in the broadcast FT messages are masked. Accordingly, before making the connections to the (new) primary, each application goes to the registry 110 to determine the actual IP address and also the port number of the primary application. The applications may utilize the masked IP address or the service ID associated with the application to acquire the necessary location information from the registry.

The change-over occurs when a primary application crashes, as discussed above, and also when a primary application is isolated by, for example, a breakdown in a communication line between the server 102 on which the application is running and the FT Monitor Processor 108. If the isolated server is running multiple primary applications, change over processes are initiated for each of the primary applications. Similarly, a change-over process occurs in response to a user-initiated termination of an application that the FT Monitor Processor 108 has ranked as the primary.

Before starting a change-over process for the applications 104 running on an isolated server 102, the FT Monitor Processor 108 attempts to disconnect from and reconnect to the isolated server. If the FT Monitor Processor fails to re-establish a connection, the FT Monitor Processor next sends one or more DOWN messages to indicate that identified applications that are running on the isolated server are considered down, and thus, start the change-over operations for these applications.

When the FT Monitor Agent 106 in the (isolated) server determines that it is isolated, the FT Monitor Agent sends an ISOLATED message to the resident applications, such that any applications that have primary rankings at the time the server becomes isolated will not attempt to resume operations as primary applications once the communication link is restored. As discussed, the FT messages are received by and responded to by the FT Monitor Interfaces 105 of the respective applications. Accordingly, the FT Monitor Interface includes in its operations after the server re-establishes the connection to the network, a step of contacting the FT Monitor Processor 108 to get a new ranking. The step is performed by at least an application that, before being isolated, had a primary ranking, and may be also performed by every other application on the server.

The FT Monitor Processor 108 maintains a timer 109 for each change-over operation, in order to determine if the designated (new) primary is able to operate as the primary. Thus, the FT Monitor Processor starts the timer as soon as the CHANGE message is sent. If the timer goes off before the designated primary notifies the FT Monitor Processor that the application is "ready," the FT Monitor Processor broadcasts a DOWN message that identifies the mirror application, followed by a CHANGE message that identifies the next highest ranking mirror application in the FT group as the next rank number one application.

The system 100, and the functionality provided by the various applications 104, are readily scalable in the sense that new instances may join the existing FT groups and become incorporated into the fault tolerance operations by the assigning of rankings to the instances when the instances come up on the system. Further, new FT groups may be created when new processes, that is, new functionalities, are added to the system. To add a new FT group to the system, a new definition is added to the system and made available for selection by users through a system front end, as discussed in more detail below. Thereafter, applications are associated with the group and assigned the appropriate rankings, all in the manner discussed above.

The front end operations of the FT Monitor system provide wizards that allow users to add the new servers, new applications, that is, new functionalities, and new instances into the fault tolerant operations. For each new application and instance, the appropriate wizard instructs the user to select an FT group from among those defined on the system. The wizard may also allow new FT groups to be created in the same process, if, for example, a totally new application is being added. The wizard thereafter associates the respective new applications or the instances of the various applications with the user selected new or previously established FT groups, and the FT Monitor Processor provides the appropriate rankings within the selected FT groups, when the applications or instances come up on the system.

As discussed, each server includes an FT Monitor Agent 106 and each application includes an FT Monitor Interface 105, both of which operate together to initiate, receive and respond to the FT messages and heartbeats involved in the fault tolerance operations. Accordingly, the underlying operations of the FT Monitor sub-system do not change, and the newly added servers, applications and instances are fully incorporated into the fault tolerant operations as soon as they come up on the system.

Referring again to FIG. 1, the system 100 includes a redundant FT Processor 108' that acts as a mirror to the primary FT Processor 108. A heartbeat passes between the two FT Monitor Processors, such that the mirror can detect if the primary FT Monitor Processor crashes. The minor FT Monitor Processor then proactively establishes itself as the primary, and contacts the registry 110 to update the associated listing in the registry. In the example, the FT Monitor Agents 106 send heartbeats and other messages to each of the FT Monitor Processors, and thus, the mirror FT Monitor Processor has up-to-date status information for each of the applications 104 on the system 100. Alternatively, the FT Monitor Agents may instead send messages only to the primary FT Monitor Processor, such that when the minor FT Monitor Processor takes over as the primary, the (new) primary FT Monitor Processor notifies the FT Monitor Agents of the change using appropriate FT messages, and the FT Monitor Agents then modify their operations to send the heartbeat messages to the (new) primary FT Monitor Processor. In this arrangement, the FT Monitor Processor 108 provides periodic status updates to the minor FT Monitor Processor 108', such that the minor processor maintains up-to-date status information.

As an alternative embodiment, certain applications may connect to a mirror application rather than the primary for particular services, as directed by the application specifications. The mirror applications to which other applications connect "service" the other applications, and the mirror applications are thus listed in the registry 110 (FIG. 1). Accordingly, the applications that connect to the respective mirrors are directed to the mirrors through the registry listings.

The mirror applications that provide services while the primary is running are assigned service IDs that correspond to the rank assigned to the mirror applications as the mirror applications come up on the system. At the same time, the mirror applications configure themselves to provide the services associated with the assigned rank, and supply their service IDs and location information to the registry 110.

When a mirror application listed in the registry fails, the FT Monitor Processor informs the registry, which lists the mirror as off-line. The FT Monitor processor then sends a DOWN message over the system. In response to the DOWN message, the other applications connected to the failed mirror disconnect. The disconnected applications then reconnect to either the primary application or a next ranking mirror application, as appropriate, that is, as dictated by the respective application specifications.

If the primary fails and a change-over occurs, the rankings of all of the mirror applications except the one appointed as the new primary remain the same. The applications that are connected to the mirror application that changes over to the primary disconnect from the mirror application and reconnect to the next ranking mirror application, that is, the mirror application which ranks next to the mirror which has come up as primary. The applications that are connected to the remaining mirror applications remain connected, however, and the rankings of these mirrors do not change. The system can readily be configured to re-rank the mirrors if a system administrator should so require. Alternatively, applications that disconnect from the highest ranking mirror application before the change over may instead reconnect to the same application, which is now configured as the new primary.

In the exemplary system, the only time a mirror application changes its service ID is when the mirror application changes over to the primary application, since the mirror application does not otherwise change its rank. If, instead, the lower ranking mirror applications change their ranks in response to the failure of the primary application and/or a given mirror application, the mirror applications also change their service IDs, and thus, the other applications connected to the mirror applications must also change their connections. Accordingly, the system sends appropriate CHANGE messages such that the mirror applications change rank and other applications re-connect, as appropriate.

What is claimed is:

1. A fault tolerant system for a highly scalable distributed processing system, comprising:
   a plurality of servers;
   a plurality of applications with different functionality residing across the plurality of servers with each sever running at least one application, wherein a first set of the applications perform a first function and a second set of the applications perform a second function;
   a plurality of fault tolerant agents residing on respective servers of the plurality of servers, with a given fault tolerant agent configured to communicate with an interface within each of the at least one applications residing on the same server as the given fault tolerant agent; and
   a fault tolerant monitor processor configured to communicate with the plurality of fault tolerant agents to form a fault tolerant group that is based on the first function and comprises a plurality of selected instances of the same and different applications that each perform the first function, the fault tolerant monitor processor selecting the instances across one or more servers of the plurality of servers based on the first function and ranking one of the selected instances as a primary application and the remaining instances as mirror applications.

2. The fault tolerant system of claim 1, further comprising:
   a registry configured to store information of at least primary applications in the fault tolerant group.

3. The fault tolerant system of claim 2, wherein
   each fault tolerant agent receives heartbeat messages at predetermined intervals through the interface from each of the applications running on the same server,
   the fault tolerant agent determines that a particular application has crashed if the fault tolerant agent does not receive the heart beat messages after a predetermined number of intervals have passed, and
   the fault tolerant agent notifies the fault tolerant monitor processor when the particular application has failed.

4. The fault tolerant system of claim 3, wherein the fault tolerant monitor processor determines whether the particular application that failed is the primary or the mirror.

5. The fault tolerant system of claim 4, wherein the fault tolerant monitor processor determines the particular application is the minor, reduces a mirror count of the fault tolerant group, and notifies the registry that the particular application is offline if the mirror is a service providing minor.

6. The fault tolerant system of claim 4, wherein
   the fault tolerant monitor processor determines the particular application that failed is the primary,
   the fault tolerant monitor processor broadcasts a first message to the plurality of servers, where the first message notifies the plurality of servers that the particular application has crashed, and
   the fault tolerant monitor processor notifies the registry that the particular application is off-line.

7. The fault tolerant system of claim 6, wherein the first message is a down message and includes an IP address, a process ID, a fault tolerant group name, and a number of applications still running in the fault tolerant group.

8. The fault tolerant system of claim 6, wherein the fault tolerant monitor processor broadcasts a second message to a second application which has a next highest rank that is running in the same fault tolerant group, where the second message initiates the second application to configure itself as a new primary application.

9. The fault tolerant system of claim 8, wherein the second fault tolerant message is a change message and includes an IP address, a process ID, and a rank of the second application which has the highest rank.

10. The fault tolerant system of claim 8, wherein the new primary application notifies the registry of the status of the application as the new primary for the fault tolerant group and notifies the fault tolerant monitor processor that the new primary application is ready.

11. The fault tolerant system of claim 10, wherein the fault tolerant monitor processor broadcasts a third message to the plurality of servers, where the third message notifies the plurality of servers of the new primary application.

12. The fault tolerant system of claim 11, wherein the third message is a ready message, and the ready message includes an IP address, a process ID, the fault tolerant group, and a number one rank of the new primary.

13. The fault tolerant system of claim 11, wherein the one or more applications establish communications with the new primary application.

14. The fault tolerant system of claim 13, wherein the one or more applications re-send to the new primary application any unacknowledged messages that were previously sent to the failed primary application.

15. The fault tolerant system of claim 1, further comprising:
- a new instance of an application added to a server by a user;
- a wizard for a user to select which fault tolerant group to use from a plurality of fault tolerant groups or to create a new fault tolerant group; and
- the fault tolerant monitor processor is configured to provide a ranking for the new instance within the selected fault tolerant group.

16. The fault tolerant system of claim 1, further comprising:
- a new application added to a server of the plurality of servers by a user;
- a wizard for a user to select which fault tolerant group to use from a plurality of fault tolerant groups or to create a new fault tolerant group.

17. The fault tolerant system of claim 1, further comprising:
- a new application added to each server of the plurality of servers by a user;
- a wizard for a user to select which fault tolerant group to use from a plurality of fault tolerant groups or to create a new fault tolerant group.

18. The fault tolerant system of claim 1, further comprising:
- a new server added to the plurality of servers by a user, where the new server includes one or more applications each with an interface and a new fault tolerant agent;
- a wizard for a user to select which fault tolerant group to use from a plurality of fault tolerant groups or to create a new fault tolerant group.

19. The fault tolerant system of claim 1, further comprising:
- a mirror fault tolerant monitor processor configured to receive heartbeats and other messages from the plurality of fault tolerant agents, and configured to detect if the fault tolerant monitor processor (primary) crashes and to establish itself as a new primary fault tolerant monitor processor without interruption to the plurality of servers, wherein the mirror fault tolerant monitor processor is located at the same location as the fault tolerant monitor processor (primary) or located in a separate location.

20. A fault tolerant system for a highly scalable distributed processing system, comprising:
- a first server with a first fault tolerant agent residing within, where the first fault tolerant agent is configured to communicate with a first plurality of applications with different functionality also residing on the first server, where a first set of the applications residing on the first server is configured to perform a first function and a second set of the applications residing on the first server is configured to perform a second function;
- a second server with a second fault tolerant agent residing within, where the second fault tolerant agent is configured to communicate with a second plurality of applications also residing on the second server, where a first set of the applications residing on the second server is configured to perform the first function and a second set of the applications residing on the second server is configured to perform the second function; and
- a fault tolerant monitor processor configured to communicate with the first and second fault tolerant agent to form a fault tolerant group that is based on the first function and comprises each application residing on the first and second server that performs the first function, and wherein the fault tolerant monitor processor is further configured to rank one of the applications of the fault tolerant group as a primary application and rank the remaining applications of the fault tolerant group as mirror applications.

21. The fault tolerant system of claim 20, further comprising:
- a registry configured to store information of the primary application in the fault tolerant group.

22. The fault tolerant system of claim 21, wherein
- each fault tolerant agent receives heartbeat messages at predetermined intervals through an interface from each of the applications running on the same server,
- the first fault tolerant agent determines that the primary application has crashed if the fault tolerant agent does not receive the heart beat messages after a predetermined number of intervals have passed, and
- the first fault tolerant agent notifies the fault tolerant monitor processor when the primary application has failed.

23. The fault tolerant system of claim 22, wherein the fault tolerant monitor processor determines whether the failed application is the primary or the mirror.

24. The fault tolerant system of claim 23, wherein
- the fault tolerant monitor processor determines the failed application is the primary application,
- the fault tolerant monitor processor broadcasts a first message to the plurality of servers, where the first message notifies the first and second servers that the primary application has failed, and
- the fault tolerant monitor processor notifies the registry that the primary application is off-line.

25. The fault tolerant system of claim 24, wherein the first message is a down message and includes an IP address, a process ID, a fault tolerant group name, and a number of applications still running in the fault tolerant group.

26. The fault tolerant system of claim 24, wherein the fault tolerant monitor processor broadcasts a second message to a next highest ranked mirror application that is running in the same fault tolerant group, where the second message informs the next highest ranked mirror application to configure itself as a new primary application.

27. The fault tolerant system of claim 26, wherein the second message is a change message and includes an IP address, a process ID, and a rank of the mirror application.

28. The fault tolerant system of claim 26, wherein the second instance notifies the registry of the status of the application as the new primary application for the fault tolerant group, and the next highest ranked mirror application notifies the fault tolerant monitor processor that the next highest ranked mirror application is ready to be the new primary application.

29. The fault tolerant system of claim 28, wherein the fault tolerant monitor processor broadcasts a third message to the plurality of servers, where the third message notifies the first and second servers that the next highest ranked mirror application is the new primary application.

30. The fault tolerant system of claim 29, wherein the third message is a ready message, and the ready message includes an IP address, a process ID, the fault tolerant group, and a number one rank for the new primary application.

31. The fault tolerant system of claim 29, wherein one or more applications establish communications with the new primary application.

32. The fault tolerant system of claim 31, wherein the one or more applications re-send to the new primary application any unacknowledged messages that were previously sent to the failed application.

33. The fault tolerant system of claim 20, further comprising:

a new instance of an application added to a server by a user;
a wizard for the user to select which fault tolerant group to use from a plurality of fault tolerant groups or to create a new fault tolerant group; and
the fault tolerant monitor processor configured to provide a ranking for the new instance within the selected fault tolerant group.

34. The fault tolerant system of claim 20, further comprising:
a new application added to a server of the plurality of servers by a user;
a wizard for the user to select which fault tolerant group to use from a plurality of fault tolerant groups or to create a new fault tolerant group.

35. The fault tolerant system of claim 20, further comprising:
a new application added to each server of the plurality of servers by a user;
a wizard for the user to select which fault tolerant group to use from a plurality of fault tolerant groups or to create a new fault tolerant group.

36. The fault tolerant system of claim 20, further comprising:
a new server added to the plurality of servers by a user, where the new server includes one or more applications each with an interface and a new fault tolerant agent;
a wizard for the user to select which fault tolerant group to use from a plurality of fault tolerant groups or to create a new fault tolerant group.

37. The fault tolerant system of claim 20, further comprising:
a mirror fault tolerant monitor processor configured to receive heartbeats and other messages from the first and second fault tolerant agents, and configured to detect if the fault tolerant monitor processor (primary) crashes and to establish itself as a new primary fault tolerant monitor processor without interruption to the first and second servers, wherein the mirror fault tolerant monitor processor is located at the same location as the fault tolerant monitor processor (primary) or located in a separate location.

38. A method for operating a fault tolerant system for highly scaled processing system including a plurality of servers each with a fault tolerant agent and one or more applications, comprising:
communicating with a plurality of applications with different functionality;
grouping one or more instances of the plurality of applications into a first fault tolerant group that is based on a first function, where the one or more instances reside across one or more servers of the plurality of servers and each instance of the first fault tolerant group is an application configured to perform the first function;
grouping one or more instances of the plurality of applications into a second fault tolerant group that is based on a second function, where each instance of the second fault tolerant group is an application configured to perform the second function;
ranking a first instance of the first fault tolerant group as a primary application with a rank of one and ranking the remaining applications of the first fault tolerant group as mirror applications;
notifying a fault tolerant monitor processor by a first fault tolerant agent that the first instance of the first fault tolerant group on a first server has failed;
broadcasting a first message by the fault tolerant monitor processor to the plurality of servers;
disconnecting all other applications communicating with the first instance;
broadcasting a second message to a second instance within the first fault tolerant group, where the second instance has a second highest rank and the second instance is a second application on the first server or a second server to perform the first function;
configuring the second instance as a new primary application of the first fault tolerant group;
broadcasting a third message by the first fault tolerant monitor processor to the plurality of servers to notify the servers that the second instance is the new primary application;
connecting the other applications to the second instance; and
re-sending all unacknowledged messages by the other applications to the second instance.

39. The method of claim 38, further comprising:
notifying a registry that the first instance is the primary application.

40. The method of claim 39, further comprising:
notifying the registry upon the failure of the first instance;
removing the first instance from the registry; and
storing in the registry the second instance as the new primary application.

41. The method of claim 39, further comprising:
adding to a server of the plurality of servers a new application to perform the first function as a third instance;
assigning a rank to the third instance; and
marking the third instance as a mirror application.

42. The method of claim 41, further comprising:
notifying the registry of the third instance and the rank of the third instance, if third instance is a service providing mirror.

43. The method of claim 38, wherein the first message is a down message and includes an IP address, a process ID, a fault tolerant group name, and a number of applications still running in the first fault tolerant group.

44. The method of claim 38, wherein the second message is a change message and includes an IP address, a process ID, and a rank of the second instance.

45. The method of claim 38, wherein the third message is a ready message, and the ready message includes an IP address, a process ID, a fault tolerant group name, and a number one rank for the second instance.

46. The method of claim 38, wherein a first fault tolerant agent on the first server determines that the first instance has failed if the fault tolerant agent does not receive a heartbeat message after a predetermined period of time has lapsed.

47. The method of claim 38, further comprising:
adding a new instance of an application to a server;
using a wizard to select which fault tolerant group to use from a plurality of fault tolerant groups or to create a new fault tolerant group; and
providing by the fault tolerant monitor processor a ranking for the new instance within the selected fault tolerant group.

48. The method of claim 38, further comprising:
adding a new application to a server of the plurality of servers;
using a wizard to select which fault tolerant group to use from a plurality of fault tolerant groups or to create a new fault tolerant group.

49. The method of claim 38, further comprising:
adding a new application to each server of the plurality of servers;

using a wizard to select which fault tolerant group to use from a plurality of fault tolerant groups or to create a new fault tolerant group.

50. The method of claim 38, further comprising:
adding a new server to the plurality of servers, where the new server includes one or more applications each with an interface and a new fault tolerant agent;
using a wizard to select which fault tolerant group to use from a plurality of fault tolerant groups or to create a new fault tolerant group.

51. The method of claim 38, further comprising:
receiving by a mirror fault tolerant processor heartbeats and other messages sent by a plurality of fault tolerant agents;
detecting by the mirror fault tolerant processor if the fault tolerant processor (primary) fails; and
establishing itself as a new primary fault tolerant processor.

52. A method for operating a fault tolerant system for highly scaled processing system including a plurality of servers each with a fault tolerant agent and one or more applications, comprising:
grouping one or more instances into a fault tolerant group, where the one or more instances reside across one or more servers of the plurality of servers and each instance is an application to perform a function;
notifying a fault tolerant monitor processor by a first fault tolerant agent that a first instance on a first server has crashed, where the first instance is a primary application with a rank of one;
broadcasting a first message by the fault tolerant monitor processor to the plurality of servers;
disconnecting all other applications communicating with the first instance;
broadcasting a second message to a second instance within the fault tolerant group, where the second instance has a second highest rank and the second instance is a second application on the first server or a second server to perform the function;
configuring the second instance as a new primary application;
broadcasting a third message by the fault tolerant monitor processor to the plurality of servers to notify the servers that the second instance is the new primary application;
connecting the other applications to the second instance;
re-sending all unacknowledged messages by the other applications to the second instance;
prior to broadcasting the second message, determining if the second instance is available in the fault tolerant group, where the second instance is a mirror of the first instance;
in response to determining the second instance is available, then broadcasting the second message and subsequent steps;
in response to determining the second instance is unavailable, determining if the fault tolerant group is essential, wherein the fault tolerant group is essential if the fault tolerant group performs the function that is necessary to be completed before another function can be performed; and
in response to determining the fault tolerant group is not essential, configuring the one or more applications in other fault tolerant groups to function without the fault tolerant group.

53. A method for operating a fault tolerant system for highly scaled processing system including a plurality of servers each with a fault tolerant agent and one or more applications, comprising:
grouping one or more instances into a fault tolerant group, where the one or more instances reside across one or more servers of the plurality of servers and each instance is an application to perform a function;
notifying a fault tolerant monitor processor by a first fault tolerant agent that a first instance on a first server has crashed, where the first instance is a primary application with a rank of one;
broadcasting a first message by the fault tolerant monitor processor to the plurality of servers;
disconnecting all other applications communicating with the first instance;
broadcasting a second message to a second instance within the fault tolerant group, where the second instance has a second highest rank and the second instance is a second application on the first server or a second server to perform the function;
configuring the second instance as a new primary application;
broadcasting a third message by the fault tolerant monitor processor to the plurality of servers to notify the servers that the second instance is the new primary application;
connecting the other applications to the second instance; and
re-sending all unacknowledged messages by the other applications to the second instance; and
decreasing a mirror count of the fault tolerant group after the first instance fails.

* * * * *